March 20, 1962 H. W. CHRISTENSON 3,025,718
POWER PLANT CONTROL MECHANISM
Filed Aug. 31, 1955 2 Sheets-Sheet 2

Fig.2

INVENTOR.
Howard W. Christenson
BY
S. C. Thorpe
ATTORNEY

United States Patent Office 3,025,718
Patented Mar. 20, 1962

3,025,718
POWER PLANT CONTROL MECHANISM
Howard W. Christenson, Indianapolis, Ind., assignor to General Motors Corporation, Detroit, Mich., a corporation of Delaware
Filed Aug. 31, 1955, Ser. No. 531,697
22 Claims. (Cl. 74—645)

This invention relates to a power plant control mechanism and more particularly to a control mechanism for a power plant including a transmission adapted to provide a plurality of drive ratios between an input shaft and an output shaft.

The broad concept of reducing engine speed and power in the course of a transmission shift is generally old in the patented art. By reducing the power input to the transmission during the periods of effecting different drive ratios through the transmission, such changes in drive ratio are much more smoothly accomplished and wear on the clutch mechanisms and gears of the transmission is reduced with advantageous reductions in maintenance and replacement costs. The invention herein claimed relates to an improved application of this concept and has particular application to a transmission of a type wherein the transmission shifts or changes in the drive gear ratios are accomplished by the selective actuation of fluid-actuated clutches. The invention also has particular application to a transmission of the automatic type wherein the transmission shifts or changes in the drive gear ratios are automatically accomplished in accordance with the operative conditions of the engine and of the transmission.

Among the principal objects of the invention is to provide a power plant having a transmission adapted to provide a plurality of drive ratios between an input and output shaft by the selective actuation of fluid-actuated clutches with control means for automatically reducing the power input to the transmission during periods when the one or more of the clutches of the transmission is being actuated to effect a shift from one drive ratio to another.

It is also among the principal objects of the invention to provide a power plant having a transmission including a plurality of fluid-actuated clutches for effecting a plurality of drive ratios between an input shaft ond an output shaft with control means responsive to the initial fluid actuation of one or more of the clutches to effect a momentary reduction of power to the input shaft during the periods when certain drive ratios are being effected.

Another principal object of the invention is to provide a power plant having an automatic transmission with primary control means operable, in accordance with the speed of the transmission output shaft, to effect different drive ratios through the transmission and with secondary control means operable during periods when different drive ratios are being effected by the primary control means to reduce the power input to the transmission.

A further object of the invention is to provide a power plant having an automatic transmission including a plurality of fluid-actuated clutches for automatically effecting a plurality of drive ratios between an input shaft and an output shaft in accordance with the operative conditions of the engine and of the transmission with control means responsive to the initial fluid flow to energize one or more of the clutches to effect a momentary reduction of power to the input shaft during the periods when certain drive ratios are being effected.

In the main, these objects are attained by providing a power plant transmission mechanism with a primary control means comprising a plurality of fluid-actuated clutches for automatically effecting a plurality of drive ratios between an input shaft and an output shaft and clutch control valve means operable to selectively deliver pressurized fluid to effect the energization of the various clutches in accordance with the operative conditions of the power plant, and with a secondary control means comprising a valve operable by a pressure differential induced by the initial flow or fluid required to energize the drive-ratio-establishing clutches to deliver fluid pressure to a pressure-operated switch which in turn energizes a solenoid operable to reduce the power output of the driving engine in a suitable manner such as by reducing the fuel supply to the engine irrespective of any throttle and governor control settings.

The foregoing and other objects, features, and advantages of the invention will be more thoroughly understood from the following description of several embodiments thereof, reference being made to the accompanying drawings wherein like characters denote like or corresponding parts throughout the several views and in which.

Figure 1:
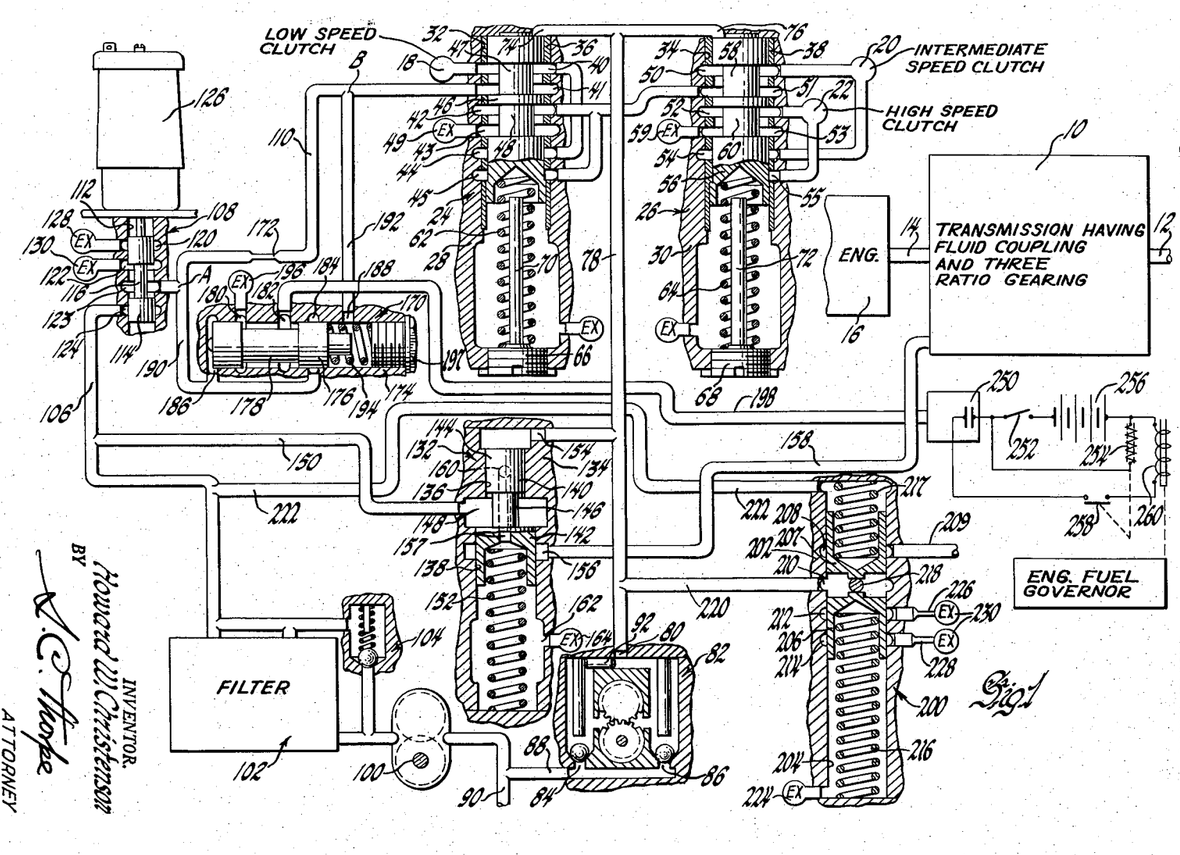
FIGURE 1 is a diagrammatic view of a power plant including an automatic transmission having portions of the control mechanism embodying the invention shown in section.

Referring more particularly to the drawings, FIGURE 1 shows an automatic transmission 10 which is adapted to be driven by a suitable prime mover 16 such as an internal combustion engine. Such a transmission normally includes a coupling such as a fluid coupling having inherent slippage characteristics, mechanism for effecting a plurality of drive ratios between an output shaft 12 and an input shaft 14, and control mechanism for effecting changes in the drive ratio through the transmission including a plurality of fluid-actuated clutches.

In the illustrated embodiment of the invention, three clutches, the inlets of which are indicated diagrammatically at 18, 20, and 22, are operable to establish low, intermediate, and high speed drive ratios, respectively through the transmission.

While only three drive-ratio-establishing clutches are shown, it will be understood that the number of drive-ratio-establishing clutches is limited only by the number of drive-ratio gear-path arrangements provided in the transmission 10. These clutches are controlled by two shift valve mechanisms 24 and 26 which are suitably actuated in accordance with the operative conditions of the engine and transmission. As explained in greater detail below, the valve mechanism 24 is operable to deliver pressure fluid to either the low-speed clutch 18 or to the shift valve mechanism 26 which is in turn operable to deliver the pressure fluid to either the intermediate clutch 20 or the high-speed clutch 22.

The valve mechanism 24 comprises a valve body 28 having a cylindrical bore 32 therein mounting a valve sleeve or bushing 36. The valve body 28 and the valve sleeve 36 have a plurality of axially spaced cooperating ports 40, 41, 42, 43, 44, and 45 which are controlled by a spool-type piston valve 46 having reduced diameter sections at 47 and 48 separated by an increased diameter section. The low-speed clutch inlet 18 is connected to the valve ports 40 and 44. The port 41 is connected to a suitable source of pressurized fluid as explained below, and the port 43 is an exhaust port connected through a conduit 49 to the transmission sump or fluid reservoir, not shown. The ports 42 and 45 are connected to the fluid inlet of the valve mechanism 26 and to the port 45. The axial spacing of the ports and the axial dimension of the reduced diameter sections 47 and 48 are such that the reduced diameter sections will interconnect adjacent valve ports in pairs as the valve member 46 is reciprocated in the bushing 36.

The valve mechanism 26 is similar to valve mechanism 24 and comprises a valve body 30 having a cylindrical bore 34 therein mounting a valve sleeve or bushing 38. The valve body 30 and the sleeve 38 are provided with similar axially spaced cooperating ports 50, 51, 52, 53, 54, and 55 which are controlled by a spool-type valve member 56 having axially spaced reduced diameter sections 58 and 60, each of which are of an axial dimension such that they will interconnect the adjacent valve ports in pairs as the valve member 56 is reciprocated in the bushing 38. The port 51 serves as a fluid inlet while the port 53 serves as an exhaust and is connected to the sump or reservoir by the conduit 59. The inlet 20 of the intermediate-speed clutch is connected to the ports 50 and 54 and the inlet 22 of the high-speed clutch is connected to the ports 52 and 55.

The valve bodies 28 and 30 are each provided with fluid inlet ports 74 and 76 at adjacent ends of the valve bores 32 and 34. These inlet ports 74 and 76, which supply pressurized fluid to the ends of the valve members 46 and 56 for actuating the shift valves 24 and 26, are interconnected through a conduit 78 to the outlet port 80 of a gear-type pump 82 which is adapted to be driven by the output shaft 12 of the transmission by a suitable driving connection, not shown. The pump 82 is provided with two check-valve-controlled inlets 84 and 86 which are connected to the transmission reservoir or sump by the conduits 88 and 90. The dual check-valve-controlled inlets, in combination with a shuttle valve 92, permits the pump 82 to deliver pressurized fluid to the conduit 78 whether the rotation of the output shaft is clockwise or counterclockwise.

The valve members 46 and 56 are each biased in opposition to the pressurized fluid supplied by the pump 82 by springs 62 and 64, respectively. These springs are interposed between the ends of the valve members 46 and 56 remote from the inlets 74 and 76 and spring-seating plugs 66 and 68 mounted in the respective valve body members 28 and 30 coaxially of the bores 32 and 34. The comparative rates of the springs 62 and 64 are such that the pressurized fluid delivered by the pump 82 will cause the piston valve member 46 to shift against its spring 62 prior to any shift of the piston valve member 56. The plugs 66 and 68 also mount, or have formed integrally therewith, internal spring guide rods 70 and 72, respectively, which also serve as stops limiting the fluid-actuated movement of the valve members 46 and 56, respectively. The chambers in the valve bodies mounting the springs 62 and 64 are connected to suitable exhaust conduits, as indicated, to prevent the entrapment of fluid therein which would adversely affect the response of the valves 24 and 26.

The clutch-actuating fluid, which is delivered to the inlet port 41 of the valve mechanism 24 as described below, is supplied by a pump 100 which is adapted to be driven by the input shaft 14 of the transmission by a suitable driving connection, not shown. The inlet of the pump 100 is connected to the sump or reservoir by the conduit 90 and discharges into a fluid filter 102 which has a check-valve-controlled bypass 104 in parallel therewith. The fluid from the filter 102 and the bypass 104 is delivered through a conduit 106 to a neutral or shift selector valve 108 which controls the delivery of the pressurized fluid through a conduit 110 to the fluid inlet port 41 of the low-to-intermediate shift valve 24.

The neutral selector valve 108 comprises a valve body having a cylindrical bore 112 therein in which a spool-type valve 114 having a reduced diameter section, indicated at 116, is reciprocably mounted. The valve member 114 is actuated by suitable means such as a solenoid, indicated at 126, to selectively interconnect adjacent axially spaced ports 120, 122, 123, and 124 opening on the bore 112. The ports 120 and 122 are both exhaust ports connectable through the conduits 128 and 130, respectively, to the transmission reservoir or sump; the port 123 is connected by the conduit 110 to the inlet port 41 of the shift control valve 24; and the port 124 is connected to the fluid supply conduit 106.

A main regulator valve 132 serves to deliver a portion of the fluid supplied through condit 106 to the fluid coupling of the transmission and also serves to bypass a portion of the fluid supplied by the pump 100 to the transmission reservoir or sump thereby controlling the fluid pressure supplied to the drive-ratio-establishing clutches. The operation of the regulator valve is preferably such that the clutch-actuating pressure will be at a relatively constant but different value during actuation of each drive-ratio-establishing clutch. Preferably, the operation of the regulator valve is also such that makeup fluid is supplied to the fluid coupling only after engagement of the low-speed clutch has occurred thereby insuring a relatively gradual initial application of power to the output shaft 12.

The regulator valve 132 comprises a valve body 134 having two coaxial cylindrical bores 136 and 138 therein of stepped diameter which are axially separated by an annular inlet port 148. The port 148 is connected to the conduit 106 by a conduit 150. The stepped bores 136 and 138 reciprocably mount ends 140 and 142 of a spool-type valve member 144. The ends 140 and 142 of the valve member are of stepped diameter and are axially spaced by a reduced diameter section 146. The valve member 144 is biased towards the small diameter bore 136 by a spring 152 interposed between the valve member and the valve body 134. The valve member 144 has a passage 157 extending axially from the spring end thereof and opening at 160 on the surface of the small diameter end. The valve body 132 has a port 154 therein for applying fluid pressure from the conduit 78 to the small diameter end 140 of the valve member to shift the valve member in opposition to the biasing effect of the spring 152 to thereby regulate the pressure level in the conduit 106. A second annular port 156 in the valve body 132 is axially separated from the inlet port 148 and connected to the fluid coupling of the transmission 10, and an exhaust port 162 connects the spring end of the valve body to the transmission sump or reservoir through an exhaust conduit 164.

When the engine 16 is started, the fluid pressure developed by the input shaft driven pump 100 is applied to the reduced diameter section of the regulator valve through the port 148. This application of pressure to the spool valve member 144, due to the area differential between the spool ends 140 and 142, results in the application of a force tending to shift the valve member 144 against the spring 152. However, as indicated above to defer filling the coupling, it is generally desirable to provide the spring 152 with sufficient rate so that the fluid pressure in line 106, in and of itself, will be unable to shift the valve member 144 to establish a fluid connection between the ports 148 and 156 thereby delivering a portion of the fluid supplied by the pump 100 through conduit 158 to the fluid coupling, until after the fluid pressure in line 106 is sufficient to engage the low clutch.

As the output shaft 12 comes up to speed after the low-speed clutch has been energized and drive has been gradually established through the partially filled fluid coupling, the fluid pressure developed by the output shaft driven pump 82 which is proportional to output shaft or vehicle speed, is applied to the small diameter end 140 of the valve member through the port 154. This application of the fluid pressure from conduit 78, which is modulated by a governor valve 200, controls the shift valves 24 and 26 and thus varies in accordance with the operative condition of the shift valves 24 and 26 in the manner explained in greater detail below, and provides an additional actuating force tending to shift the valve member 144 in opposition to the spring 152. During low-speed drive, the application of the fluid pressures in lines 78 and 106 to the valve member 144 will be effective to shift the valve member 144 to cause the reduced diameter section 146 to effect a restrictive interconnection between the fluid inlet port 148 and the port 156; the restrictive interconnection so provided metering fluid to the fluid coupling in accordance with variations in the pressure level of conduit 106 to maintain a relatively constant fluid pressure level in the conduit 106. In the intermediate drive operative condition, the actuating force applied to the valve member 144 by the governor regulated pressure in the conduit 78 will be such as to cause the valve member to be shifted to a point where the reduced diameter portion 146 will provide a substantially unrestricted flow path between the ports 148 and 156. In this intermediate drive position, variations in the pressure level of conduit 106 will also be effective to shift the valve member to maintain the pressure level in conduit 106 relatively constant. The actuating force applied to the valve member 144 by the governor regulated pressure in the conduit 78 in the high-speed drive operative condition will shift the valve member still further. This further actuation of the valve member 144 establishes a fluid connection through the passage 157 and opening at 160 between the port 148 and the exhaust port 162 provided in the spring end of the valve body 134; a fluid connection operable to maintain a relatively constant pressure level in conduit 106 by passing a portion of the fluid supplied by the pump 100 to the reservoir.

It should be noted that in the high-speed drive or bypass operative position of the control valve 144, a portion of the fluid supplied by the pump 100 to the regulator valve 132 will still be delivered to the fluid coupling through the port 156 and the conduit 158. It should also be noted that when one of the several clutches is energized, the fluid flowing to the clutch will momentarily result in a reduction in pressure in conduits 106 and 150 thereby reducing the actuating force applied to valve member 144. This reduction in actuating force permits the spring 152 to return the valve member 140 to a position decreasing the quantities of fluid delivered to the fluid coupling and bypassed to the sump. Consequently, a greater portion of the fluid supplied by the pump 100 is delivered to the energized clutch at a constant pressure with resultant fast clutch engagement at the rate controlled by orifice 172.

As indicated above, the co-operative action of the main regulator valve 132 and the governor valve 200 is such as to produce stepped reductions and increases in the fluid pressure levels of conduits 106 and 78, respectively, for actuating the several drive-connection-establishing clutches and the shift valves, respectively.

The governor valve assembly 200 comprises a valve body 202 having a cylindrical bore 204 reciprocably mounting two valve members 206 and 207 which are operable by the fluid pressures in conduits 78 and 106 to control a plurality of annular ports 208, 210, 212, and 214 opening on and formed intermediate the ends of the cylindrical bore. The valve members 206 and 207 are biased toward each other by springs 216 and 217 and a pin 218 extending transversely of the bore 204 adjacent the port 210 serves as a limit stop for the valve members. The port 210 is connected to the conduit 78 as indicated at 220 thereby continuously subjecting the opposed ends of valve members 206 and 207 to the fluid pressure in conduit 78 which is generated by the output shaft driven pump. The valve member 207 is also subjected to the pressure in conduit 106, as supplied by the input shaft driven pump and regulated by the main pressure regulator valve 132, through a conduit 222 interconnecting the upper end of bore 204 above the valve member 207 with the conduit 106. It will be noted that the applied pressure from the conduit 106 acts in series with the biased action of the spring 217 in opposition to the pressure applied to the valve member from conduit 78. The lower end of the bore 204 below the valve member 206 is connected to the transmission reservoir by the conduit indicated at 224 to prevent entrapment of the hydraulic fluid below the valve member. The valve member 207 serves as a bypass or pressure relief valve controlling the port 208 which is connected by conduit 209 through the lubrication system of the transmission to the transmission reservoir. The ports 212 and 214 are controlled by the valve member 206, which serves as a pressure regulator valve, and discharge through orifices 226 and 228, respectively, to an exhaust header indicated at 230. From the foregoing description, it will be seen that the valve members 206 and 207 of the governor valve assembly, co-operate in accordance with the line pressures in conduits 78 and 106 to regulate the pressure levels in the line 78 to control the shift valves and thus corresponding to the several drive-establishing operative positions of the shift valves 24 and 26.

In addition to the primary control means hereinbefore described for effecting different drive ratios through the transmission in accordance with the speed of the transmission output shaft, the invention contemplates the use of a secondary control means responsive to the actuation of the several clutches to reduce the power supplied to the input shaft of the transmission during periods when certain drive-ratio gear paths through the transmission are being changed. In the preferred embodiment of the invention shown in FIGURE 1, the desired reduction in power input is accomplished by providing a signal valve 170 which is responsive to a pressure differential occurring across a flow-restricting or metering device 172 in the conduit 110, such as an orifice or venturi. Such a pressure differential is developed, of course, whenever fluid is being supplied through the conduit 110 and the shift valves to actuate one of the clutches 18, 20, 22. The applied pressure differential effects the energization of a solenoid which is effective to override a power control means for the power plant such as the fuel-controlling connections of the governor or throttle control mechanisms or an ignition control in the case of a spark ignition engine.

The signal valve 170 comprises a valve body 174 having a cylindrical bore therein reciprocably mounting a spool-type valve member 176 having a reduced diameter center portion 178 which serves to interconnect axially spaced ports 180, 182, and 184 opening on the bore of the valve body 174. The port 180 is connected to the transmission reservoir or sump through the conduit 196, and the port 182 is connected through a conduit 198 to a pressure-operated switch shown diagrammatically at 250, the purpose of which is explained in detail below. Two additional ports 186 and 188 are connected to the conduit 110 by conduits 190 and 192 and serve to apply the pressures in the conduit 110 at points A and B which are before and after the orifice 172, respectively, to opposite ends of the spool valve member 176. When no fluid is flowing in the conduit 110, the pressure applied to the opposite ends of the valve member 176 will be equal, and a relatively soft spring 194 interposed between the valve member and a spring-seating plug 197 closing the end of the valve bore will maintain the valve member 176 in the position shown in FIGURE 1; the reduced center portion 178 interconnecting ports 180 and 182. However, when the pressure of the fluid in the conduit 78, as controlled by the governor valve 200, reaches a sufficient value to shift either the valve member 46 or 56 to energize a different clutch to thereby establish a different drive ratio through the transmission, the fluid flow to the clutch through the conduit 110 and the shift valve mechanism results in a pressure drop across the orifice 172. This differential in pressures causes the valve member 176 to be forced toward its spring-biased end thereby closing the port 180 and establishing a fluid connection between the ports 182 and 184. This connection results in the application of fluid pressure through the conduits 190 and 198 to actuate the pressure-operated switch 250.

Manipulation of the transmission drive selector mechanism, not shown, to a drive position, in addition to actuating the drive selector valve 114 to a position interconnecting the ports 123 and 124, closes a switch 252 thereby energizing a series circuit including a solenoid 254 and a source of electrical potential 256. Energization of the solenoid 254 closes a switch 258 which is in series circuit with a second solenoid 260, the pressure-operated switch 250, the drive selector switch 252, and the power source 256; the solenoid 260 and the switches 250, 258 also being in parallel with the solenoid 254. The solenoid 260 is preferably operable to override the governor of the engine to reduce the fuel supply of the engine and thereby the power delivered to the input shaft of the transmission. However, the solenoid 260, as indicated above, may be operable to override the throttle control linkages independently of the engine governor or may be operable to render the ignition system of a spark ignition engine ineffective.

From the foregoing description of the embodiment of the invention shown in FIGURE 1, it is believed that the operation of this transmission control system will be obvious to those skilled in the art. However, this operation is set forth briefly below.

When the transmission drive selector is in a first neutral or "parking" position, the selector valve 114 is in a position where the reduced diameter portion 116 bridges the exhaust ports 120 and 122. One end of the valve 114 blocks the port 123 leading to the shift valves 24 and 26 and any fluid pressure supplied by the pump 100 is applied to the end of the spool valve member 114 thereby tending to maintain the valve in its parking position. When the transmission drive selector is shifted to a second "normal neutral" position, the selector valve 114 is actuated by the solenoid 126 to the position shown in FIGURE 1 whereby the conduit 110 leading to the shift valves 24 and 26 is connected to the exhaust conduit 130 by the reduced diameter portion 116 which bridges the ports 123 and 124.

When the transmission drive selector is shifted to its "drive" position, the valve member 114 is shifted to a position where it bridges the ports 123 and 124. In this operative position, the valve 108 delivers pressurized actuating fluid to the low-speed clutch 18 through the conduit 110 and the shift valve 24 from the conduit 106 at the low-speed pressure level maintained by the pressure regulator vale 132; the reduced diameter portion 47 of the shift valve member 46 bridging the ports 40 and 41. The resulting flow of fluid to the low-speed clutch 18 through the metering device 172 will normally result in a pressure differential between points A and B in conduit 110 sufficient to actuate the signal valve 170 thereby energizing the overrule solenoid 260 to reduce engine power momentarily during the period the low-speed clutch is being energized. It is contemplated, however, that at some relatively low input shaft speeds at or near engine idle, the fluid delivery from the input shaft driven pump 100 may be insufficient to develop a flow indicative pressure differential to actuate the signal valve against the biasing action of the spring 194.

After energization of the low-speed clutch, power is transmitted through the fluid coupling to the output shaft 12. The resultant fluid pressure generated by the output shaft driven pump 82 is delivered to the line 78 from which it is applied to the main pressure regulator valve 132 and causes the valve member 144 to shift to a position whereby additional fluid is supplied through the conduit 158 to the fluid coupling while at the same time maintaining a predetermined low-speed pressure level in the conduit 106.

The fluid pressure supplied to the governor valve assembly 200 through conduits 106 and 222 from the input shaft driven pump is operable in series with the spring 217 to maintain the end of the valve member 207 in abutment with the pin 218 in opposition to the fluid pressure supplied by the output shaft driven pump 82 when the shift valves 24 and 26 and the main pressure regulator valve 132 are in their low and intermediate speed drive ratio positions. When the transmission is in its low-speed drive ratio operative condition, the delivery of the output shaft driven pump is relatively small due to the relatively slow speed of the output shaft. This fluid delivery translated into fluid pressure is sufficient to shift the valve member 206 in opposition to the spring 216. This shifting of the valve member 206 establishes a fluid-metering connection between the ports 210 and 212 of the governor pressure regulator valve, and any variations in the pressure level of conduit 78 result in corresponding variations in the metering connection thereby tending to maintain the pressure level in the conduit 78 at a desired low-speed clutch-actuating level.

As the speed of the engine is increased in low-speed drive, consequently increasing the speed of the output shaft 12, the fluid delivered by the output shaft driven pump 82 increases to a point where the valve member 206 of the governor valve assembly is no longer able to maintain the low-speed clutch actuating pressure in line 78; the port 212 being fully opened. Further increase in the rotational speed of the output shaft beyond this point consequently results in a rapid increase in the pressure level in line 78. At a predetermined speed, about in the middle of this pressure rise in line 78, the pressure moves valve 24 against spring 62 to shift the transmission from low to intermediate ratio. The increased pressure in line 78 also biases valve 144 to reduce the pressure in conduit 106 inversely proportional to the pressure rise in line 78. This increased pressure results in further shifting or biasing of the valve members 144 and 206 until they reach the positions at which they terminate the pressure rise and initiate their maintenance of the intermediate drive ratio constant pressures in the lines 106 and 78, respectively. This further shifting of the valve member 206 establishes a fluid-metering connection between the ports 210 and 214; the orifice 226 preventing any substantial loss in pressure through the fully opened intermediate port 212; and any variations in the pressure in the conduit 78 resulting in corresponding variations in the depression of the valve 206 to thereby meter sufficient fluid through the port 214 and orifice 228 to maintain the desired intermediate-speed constant pressure in the conduit 78. The shifting or biasing of valve 144 by the intermediate speed constant pressure in line 78 causes the valve 144 to regulate the pressure in conduit 106 at the intermediate speed constant pressure.

During the pressure rise from the low to the intermediate-drive-ratio pressure in conduit 78, its application to the shift valve 24 causes the valve member 46 to shift rapidly, in opposition to the spring 62, to a position where it abuts its stop 70. In this position, the actuating fluid in the low-speed clutch will be discharged through the passage 49 and the reduced diameter portion of the valve member 46 to the exhaust port 43 thereby de-energizing the low-speed clutch. At the same time, the fluid pressure supply conduit 110 will be connected through the port 41, the reduced diameter section 47 of the valve member, and the port 42 to the port 51 of the shift valve mechanism 26. The intermediate-speed drive-ratio-establishing fluid pressure in the line 78 applied through the port 76 will be insufficient to shift the valve member 56 from the position shown in FIGURE 1 inasmuch as the rate of the spring 64 is greater than the spring 62. Consequently, the clutch-actuating fluid pressure supplied to the port 51 will be directed by the reduced diameter portion 58 of this valve member to the port 50 from which it will be delivered to the intermediate clutch 20.

As the engine speed, and thereby the output shaft speed, is increased in intermediate-speed drive through the transmission, the fluid delivered by the output shaft driven pump 82 will increase to a point where the governor valve member 206 is no longer able to maintain the intermediate-drive-ratio pressure in conduit 78; the ports 212 and 214 being fully opened. Beyond this speed, the pressure in conduit 78 will increase and the application of this increased pressure in the conduit 78 to the main pressure regulator valve 132 shifts the valve member 144 to its position bypassing a portion of the fluid delivered by pump 100 to the sump. This reduces the pressure in the conduit 106 to a value permitting the pressure in the conduit 78 to shift the valve member 207 out of abutment with the pin 218 against the combined biasing action of the spring 217 and pressure from the conduit 106. As the high-speed clutch-actuating pressure is approached in the conduit 78, the resultant upward shifting of the valve member 207 establishes a fluid connection between the ports 210 and 208, in addition to the fluid connections previously established by the valve member 206 between the ports 210, 212, and 214, and any variations in the fluid pressure level in conduit 78 result in corresponding variations of the fluid connection between the ports 210 and 208 to maintain the desired high-speed constant pressure level in conduit 78.

Application of the pressure in line 78 as it increases to the high-speed constant pressure to the shift valve 26 causes the valve member 56 to be shifted into abutment with the stop 72. In this position, the actuating fluid in the intermediate speed clutch 20 will be directed to the exhaust conduit 59 through the port 54, the reduced diameter portion 60 of the valve member 56, and the port 53; and the fluid pressure supplied from the input shaft driven pump 100 through the shift valve mechanism 24 to the port 51 will be delivered by the reduced diameter portion 58 of the valve member 56 through the port 52 to the high-speed clutch 22. The fluid in line 78 at the high speed pressure level also acts on valve 144 to further reduce the pressure in conduit 106.

Thus the pressure in line 78, which is proportional to output speed, has a constant low pressure level in low speed until the first pressure rise which actuates shift valve 24 for the low to intermediate shift, then an intermediate pressure level in intermediate ratio until the second pressure rise which actuates shift valve 26 for the intermediate to high shift and then a high pressure level in high ratio. Conversely the pressure in line 106 which engages the ratio clutches is decreased in similar steps to provide a high pressure in low ratio, an intermediate pressure in intermediate ratio and a low pressure in high ratio.

The rate of fluid flow in the conduit 110 during the intervals when the intermediate and high-speed clutches are being energized will be sufficient to result in pressure differentials between points A and B in conduit 110 which, applied to the opposite ends of the signal valve member 176, will effect a shift in the signal valve to bleed a portion of the supplied pressurized fluid through the conduit 198 to the pressure-operated switch 250. Inasmuch as the switches 252 and 258 will be closed by movement of the transmission drive selector to its "drive" position, the closing of the switch 250 will energize the overrule solenoid 260 of the engine power control thereby effecting a reduction in the engine power applied to the transmission through the input shaft 14. After the drive-ratio-establishing clutch has been energized, the flow of fluid will stop in the conduit 110 and the pressure at points A and B will become equalized. The spring 194 will then return the valve member 76 to the position shown in FIGURE 1, connecting the pressure-operated switch 250 to the transmission reservoir through the conduit 198, ports 182 and 180, and the conduit 196. The resulting reduction of pressure in the conduit 198 permits the switch 250 to open, de-energizing the solenoid 260 overruling the engine power control, and the engine is permitted to pick up to the power setting of the power control mechanism.

Figure 2:
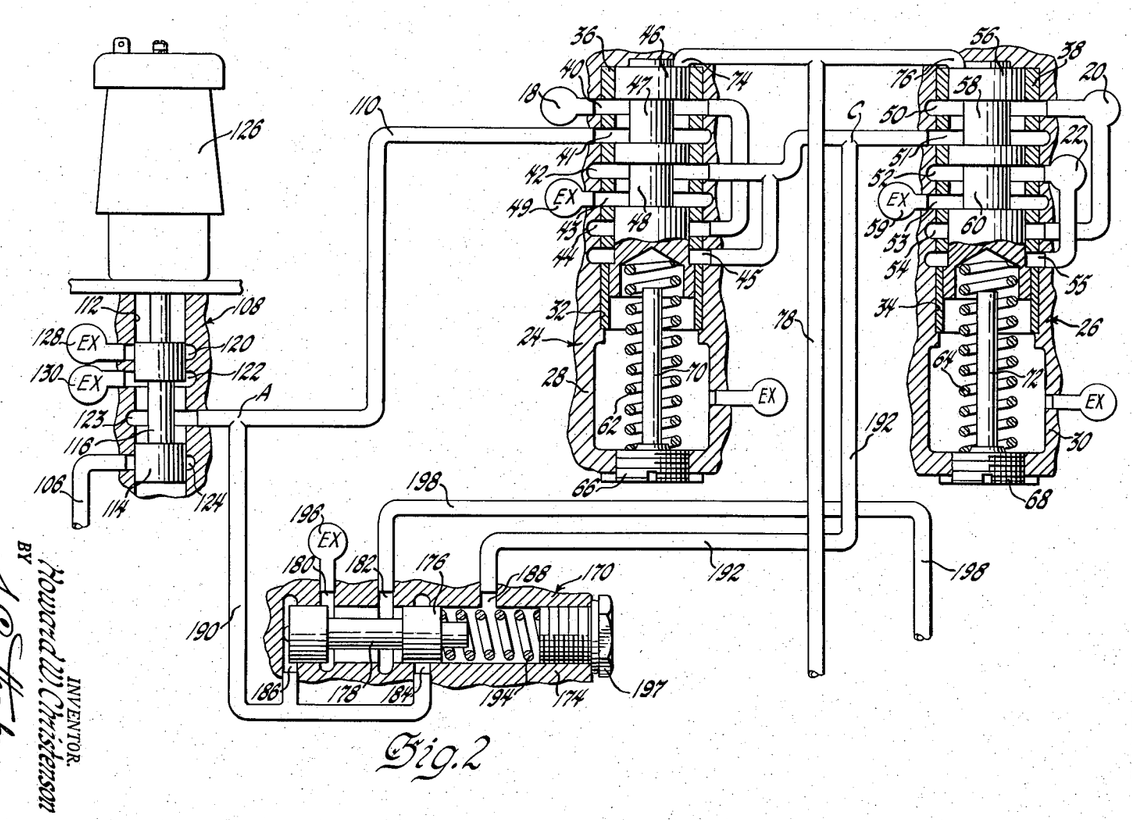
FIGURE 2 is a diagrammatic view similar to a portion of FIGURE 1 and showing a modified form of the invention.

The form of the invention shown by FIGURE 2 is identical with that shown in FIGURE 1 except that the restriction to fluid flow through the shift valve 24 is utilized in place of the flow-metering device 172, and the signal valve 174 is responsive to pressure differentials occurring between point A and a point C which is located in the conduit supplying fluid pressure from the shift valve mechanism 24 to the shift valve mechanism 26. In this form of the invention, when the valve 114 is shifted from its "normal neutral" position to its "drive" position, the pressure at point A in line 110 actuates the signal valve 170 to thereby energize the engine power-reducing solenoid 260; the spring end of the valve member 176 being subjected merely to the exhaust pressure obtaining at point C. The valve member 174 will remain in its reduced-engine-power shifted position until after the speed of the output shaft driven pump has increased sufficiently to effect an upshift by actuation of the intermediate speed clutch. When the flow of actuating fluid to the intermediate-speed clutch has stopped, the static pressures at points A and C will be the same. The consequential return of the valve member 176 to the left by the spring 194 will exhaust the pressure-operated switch 250 through the conduit 196 thereby de-energizing the overrule solenoid 260. Similarly when the speed of the output shaft and the corresponding pressure in the conduit 78 have reached values sufficient to effect the energization of the high-speed clutch, the flow induced pressure differential will momentarily effect a reduction in engine power through secondary control mechanism while the high-speed clutch is being energized.

While the foregoing description and drawings have been confined to several illustrative embodiments of the invention, it will be apparent to those skilled in the art that the invention is adaptable to automatic transmissions generally and it will be further appreciated that various modifications may be made therein without departing from the spirit and scope of the invention as defined in the claims below.

I claim:

1. A control mechanism for a transmission adapted to provide multiple gear drive ratios between an input shaft and an output shaft, said control mechanism comprising, in combination, a plurality of fluid-operated drive engaging means individually energizable to establish different gear drive ratios through said transmission, a first fluid pressure supply means operable to supply fluid in accordance with the speed of the input shaft of said transmission, a second fluid pressure supply means operable to supply fluid at a pressure in accordance with the speed of the output shaft of said transmission, regulating valve means responsive to the fluid pressures generated by said first and second supply means for regulating the output pressure levels of said supply means in accordance with the drive-ratio operative condition of said transmission, control valve means operable in response to the pressurized fluid supplied by said second supply means to control the supply of pressurized fluid from said first supply means to said gear drive-ratio selecting fluid operated drive engaging means, signal means providing a signal when and only when fluid controlled by said control valve means flows to said fluid operated drive engaging means, and means responsive to said signal means to reduce the power delivered to the input shaft of said transmission in response to said signal indicating flow of fluid during periods of transmission gear drive ratio shifting.

2. A control mechanism for an automatic-type transmission including a fluid coupling and adapted to provide a plurality of different drive ratios between an input shaft and an output shaft, said mechanism comprising an input shaft driven pump adapted to deliver fluid in accordance with the speed of the input shaft, an output shaft driven pump adapted to deliver fluid in accordance with the speed of said output shaft, pressure regulating means operable by the fluid pressures generated by said input and output shaft driven pumps to deliver a portion of the fluid delivered by said input shaft driven pump to the fluid coupling of said transmission and, under certain operative conditions, to exhaust a portion of the fluid supply by said input shaft driven pump thereby tending to maintain the discharge of said input shaft driven pump at relatively constant pressure levels corresponding to the drive ratios established through the transmission, a second regulating means tending to maintain the discharge of said output shaft driven pump at relatively constant pressure levels corresponding to the drive ratios established through the transmission, a plurality of fluid-actuated ratio establishing means operable to effect different drive ratios through said transmission, said fluid actuated ratio establishing means including a low-speed drive-ratio-establishing device, an intermediate-speed drive-ratio-establishing device, and a high-speed drive-ratio-establishing device, a first control valve operable by the pressurized fluid delivered by said output shaft driven pump between a position delivering pressurized fluid from said input shaft driven pump to actuate said low-speed drive ratio establishing device in said transmission and a position exhausting said low-speed drive ratio establishing device, a second valve operable by the pressurized fluid of the output shaft driven pump when said first valve is in said last-mentioned position between a first position delivering pressurized fluid from said input shaft driven pump to said intermediate-speed drive ratio establishing device and exhausting said high-speed drive ratio establishing device and a second position delivering pressurized fluid to energize said high-speed drive ratio establishing device and exhausting said intermediate-speed drive ratio establishing device, means reducing the pressure at a control point when one of said clutches is being energized and means responsive to a reduction in the fluid pressure at said control point supplied by said first input shaft driven pump when one of said clutches is being energized and operable in response thereto to effect a reduction in the power delivered to said input shaft.

3. In a power plant having a transmission including a fluid coupling and adapted to provide a plurality of different drive ratios between an input shaft and an output shaft, control mechanism comprising, in combination, a plurality of fluid-actuated ratio engaging devices individually operable to establish different drive ratios through said transmission, said fluid actuated ratio engaging devices including a low-speed fluid actuated ratio engaging device, at least one intermediate-speed fluid actuated ratio engaging device, and a high-speed fluid actuated ratio engaging device, an input shaft driven pump adapted to supply fluid for actuating said fluid actuated ratio engaging devices and circulating fluid through said fluid coupling, an output shaft driven pump adapted to supply fluid in accordance with the speed of said output shaft, pressure regulating means operable by the fluid pressures delivered by said input and output shaft driven pumps to deliver a portion of the fluid delivered by said input shaft driven pump to the fluid coupling of said transmission and to exhaust portions of the fluid supplied by said input and said output shaft driven pumps thereby tending to maintain the discharge pressures of said pumps relatively constant at different levels corresponding to selective energization of said fluid actuated ratio engaging devices, a first shift control valve for delivering pressurized fluid from said input shaft driven pump to actuate said low-speed ratio-establishing device in said transmission in one operative position thereof and operable by the pressurized fluid delivered by said output shaft driven pump to a second operative position de-energizing said low-speed ratio establishing device, said first shift valve in said second position delivering pressurized fluid from said input shaft driven pump to a second shift control valve, said second valve in a first operative position thereof delivering pressurized fluid from said first control valve to said intermediate-speed ratio-establishing device and operable by the pressurized fluid of the output shaft driven pump to a second operative position delivering pressurized fluid to energize said high-speed drive-ratio-establishing device, signal means providing a signal when and only when fluid flows to at least one of said fluid operated ratio engaging devices, and means responsive to said signal means to reduce the power delivered to the input shaft of said transmission in response to said signal indicating flow of fluid during period of change of actuation of said fluid operated ratio engaging devices.

4. A control system for a power plant including an engine and a transmission having a plurality of drive-gear ratios between input and output shafts thereof controlled by fluid-operated drive-gear-ratio-establishing mechanisms, said transmission control system comprising, in combination, a first fluid pressure supply means including a pump adapted to be driven by the input shaft of said transmission, a second fluid pressure supply means including a pump adapted to be driven by the output shaft of said transmission, shift valve means operable in response to said second pressure supply means to selectively deliver pressurized fluid from said first pressure supply means to said drive-gear-ratio-establishing mechanisms to establish drive ratios through said transmission in accordance with the operative relationship between said shafts, signal means providing a signal when and only when fluid flows to said mechanisms, and power reducing means responsive to said signal means to reduce the engine power during periods of shifting from one to another of the gear drive ratios of the transmission.

5. A control system as set forth in claim 4 in which said last-mentioned power-reducing means includes an engine control means, an electrical control means including a solenoid operable through said engine control means to reduce the engine power output, a source of electrical potential, and a pressure-operated switch adapted to energize said circuit to cause said solenoid to reduce the engine power output, said solenoid, said potential source, and said switch being in series circuit, and said signal means including a signal valve responsive to fluid flow through said shift valve means to deliver actuating pressure fluid to said pressure-operated switch to thereby energize said solenoid during said transmission drive-gear-ratio shifts.

6. A control system as set forth in claim 4 in which said power reducing means includes an engine control means, said signal means includes means for metering the fluid flow to said drive gear ratio establishing mechanism, and means responsive to flow-induced pressure differentials through said metering means and operable in response thereto to actuate said engine control means to reduce engine power during said transmission drive-gear-ratio shifts.

7. In a power plant including an engine and a transmission having a fluid coupling and a plurality of drive-gear paths therethrough between an engine-driven input shaft and an output shaft controlled by fluid-operated gear path selecting devices, control mechanism comprising, in combination, a pump driven by the input shaft of said transmission, a pump driven by the output shaft of said transmission, pressure regulator means operable by the fluid pressures supplied by said pumps to regulate the discharge pressure levels of both of said pumps in accordance with the drive-gear path effected through said transmission, valve means operable in response to the discharge pressure level supplied by said output shaft driven pump to selectively deliver pressurized fluid from said input shaft driven pump to said devices to establish different drive gear paths through said transmission, engine power control means, and means responsive to the flow of pressurized fluid to said devices and operable in response thereto through said engine control means to reduce engine power during periods of transmission gear-path shifting, said last-mentioned means including means for metering the fluid flow to said clutches, and a means operable in response to a flow induced pressure differential signal across said metering means to override said engine power control to reduce the engine power output when said drive-gear-path-establishing devices are being actuated.

8. In an automatic transmission adapted to provide a plurality of drive ratios between an input and an output shaft, a control system comprising, in combination, a plurality of fluid-actuated ratio engaging means operable to establish different drive ratios through said transmission, a means responsive to the operation of said output shaft, means associated with said input shaft and operable in accordance with said output shaft responsive means to selectively supply actuating fluid to said fluid actuated ratio engaging means to establish different drive ratios through said transmission in accordance with the speed of said output shaft, signal means providing a signal when and only when fluid flows to said forward actuated ratio engaging means, and means responsive to said signal means to effect a reduction in the power applied to said input shaft in response to said signal indicating flow of fluid during periods when said fluid actuated ratio engaging means is being actuated to establish a drive ratio through said transmission.

9. A control mechanism for an automatic transmission adapted to provide a plurality of drive ratios between an input and an output shaft, said control mechanism including fluid-actuated means for effecting changes in the drive ratio through said transmission in accordance with the speed of said output shaft, signal means providing a signal when and only when fluid flows to said first means for effecting changes in the drive ratio through said transmission, and means responsive to said signal means to effect a reduction in the power delivered to the input shaft in response to said signal indicating flow of fluid when said first means are being actuated to change the drive ratio through the transmission.

10. A control mechanism for a power plant including a transmission adapted to provide a plurality of drive ratios between an input and an output shaft, said control mechanism including fluid-actuated means for effecting changes in the drive ratio through said transmission, signal means providing a signal when and only when the fluid flows to said first means, and means responsive to said signal means to reduce the power delivered to said input shaft in response to said signal means indicating a flow of fluid to change the drive ratio through the transmission.

11. In a transmission adapted to provide a plurality of drive ratios between an input and an output shaft, a control system comprising, in combination, a plurality of fluid-actuated ratio engaging means operable to establish different drive ratios through said transmission, means to selectively supply actuating fluid to said fluid actuated ratio engaging means to establish different drive ratios through said transmission, signal means providing a signal when and only when fluid flows to fluid actuated ratio engaging means to establish a drive ratio, and means responsive to said signal means to effect a reduction in the power applied to the input shaft in response to said signal indicating flow of fluid during periods when said fluid actuated ratio engaging means are being actuated to establish different drive ratios through said transmission.

12. In a power plant including an engine, a transmission, and a plurality of fluid-operated ratio engaging devices for selectively energizing different drive-gear paths through the transmission between an engine-driven input shaft and an output shaft, control mechanism comprising, in combination, a pump adapted to be driven by the engine, valve means operable to selectively deliver pressurized fluid from said pump to said ratio engaging devices to establish drive gear paths through said transmission, and means responsive only to the flow of pressurized fluid to said ratio engaging devices and operable in response only to flow thereto to reduce engine power during such periods of shifting the gear path through the transmission, said last-mentioned means including means for metering the fluid flow to said ratio engaging devices, and means operable in response to a flow-induced pressure differential signal across said metering means to reduce the engine power output when said drive-gear-path-establishing devices are being actuated.

13. A transmission control system for a power plant including an engine and a transmission having a plurality of drive gear ratios between input and output shafts thereof controlled by fluid operated drive-gear-ratio-establishing mechanisms, said transmission control system comprising, in combination, a first fluid pressure supply means, a second fluid pressure supply means, pressure regulating means interconnecting said first and said second fluid supply means and modifying the output pressure levels thereof in accordance with the operative relationship between said shafts, valve means operable in response to said second pressure supply means to selectively deliver pressurized fluid from said first pressure supply means to said drive-gear-ratio-establishing mechanisms to establish drive ratios through said transmission in accordance with the operative relationship between said shafts, signal means providing a signal when and only when fluid flows to actuate said mechanism to establish a drive, and means responsive to said signal means to reduce engine power in response to said signal indicating flow of fluid.

14. In a transmission assembly, input and output members, a multi-ratio transmission having a first, second, and third fluid operated means operative respectively to establish a first, second, and third ratio between said input and output members, a source of fluid under pressure, a passage, a first shift valve having a first position connecting said source to said first fluid operated means and said passage to exhaust, and a second position connecting said first fluid operated means to exhaust and said source to said passage, a second shift valve having a first position connecting said passage to said second fluid operated means and said third fluid operated means to exhaust and a second position connecting said passage to said third fluid operated means and said second fluid operated means to exhaust, and governor controlled means actuated by said output member and connected to control said shift valves to first shift said first valve and then shift said second valve from said first to said second positions.

15. In a transmission assembly, input and output members, a multi-ratio transmission having a first, second, and third fluid operated means operative respectively to establish a first, second, and third ratio between said input and output members, a source of fluid under pressure, a passage, a first shift valve having a first position connecting said source to said first fluid operated means and said passage to exhaust, and a second position connecting said first fluid operated means to exhaust and said source to said passage, a second shift valve having a first position connecting said passage to said second fluid operated means and said third fluid operated means to exhaust and a second position connecting said passage to said third fluid operated means and said second fluid operated means to exhaust, governor controlled means actuated by said output member and connected to control said shift valves to first shift said first valve and then shift said second valve from said first to said second positions, said first valve having an unbalanced area ineffective in said first position and effective in said second position in response to fluid supplied to said second fluid operated means to resist return movement to said first position, and said second shift valve having an unbalanced area ineffective in said first position and effective in said second position in response to fluid supplied to said third fluid operated means to resist return movement to said first position.

16. In a transmission assembly, input and output members, a multi-ratio transmission having a first, second, and third fluid operated means operative respectively to establish a first, second, and third ratio between said input and output members, a source of fluid under pressure, a passage, a first shift valve in a first position having a first balanced port connecting said source to said first fluid operated means and having a second balanced port connecting said passage to exhaust, and in a second position having said second port connecting said first fluid operated means to exhaust and said first port connecting said source to said passage, a second shift valve in a first position having a first balanced port connecting said passage to said second fluid operated means and a second balanced port connecting said third fluid operated means to exhaust and in a second position having said first port connecting said passage to said third fluid operated means and said second port connecting said second fluid operated means to exhaust, governor controlled means actuated by said output member and connected to control said shift valves to first shift said first valve and then shift said second valve from said first to said second position, said first valve having an unbalanced area ineffective in said first position and effective in said second position in response to fluid supplied to said second fluid operated means to resist return movement to said first position, and said second shift valve having an unbalanced area ineffective in said first position and effective in said second position in response to fluid supplied to said third fluid operated means to resist return movement to said first position.

17. In a transmission having an input shaft, an output shaft, drive establishing means to establish a plurality of drives between said input shaft and output shaft, a pump driven by a shaft and providing a stepped pressure increasing with said shaft speed connected to said drive establishing means to control said drive establishing means to provide a drive in each step of said increasing pressure, including valve means to modulate said pump pressure in steps including a first valve element movably mounted in a body having first and last individual orifice exhausts spaced apart in the direction of valve element movement, first biasing means urging said first valve element in one direction and said first valve element being urged in the opposite direction by said pump pressure from a first position blocking exhaust flow from said pump to exhaust to a second position opening said first orifice exhaust and to a last position opening said last orifice exhaust, a second valve element having a first position blocking flow from said pump to exhaust and a second position connecting said pump to exhaust, second biasing means urging said second valve element in one direction and said second valve element being urged in the opposite direction by said pump pressure from said first position blocking flow of said pump pressure to exhaust to said second position connecting said pump to exhaust to regulate said pump pressure at a constant value, and said second biasing means holding said second valve element in said first position until said pump pressure rises above the value required to move said first valve element to said last position and then said second valve moving to said second position to limit further rise of said pump pressure.

18. In a transmission having an input shaft, an output shaft, drive establishing means to establish a plurality of drives between said input shaft and output shaft, a pump driven by a shaft and providing a stepped pressure increasing with said shaft speed connected to said drive establishing means to control said drive establishing means to provide a drive in each step of said increasing pressure, including valve means to modulate said pump pressure including a first valve element movably mounted in a body having exhaust orifice means progressively opened to exhaust by said first valve element, first biasing means urging said first valve element in one direction and said first valve element being urged in the opposite direction by said pump pressure from a first position blocking flow from said pump to exhaust, to a second position partially opening said exhaust orifice means and to a last position fully opening said exhaust orifice means, means to provide a fluid pressure inversely proportional to the speed of said shaft, a second valve element urged by said fluid pressure inversely proportional to the speed of said shaft in one direction and urged in the opposite direction by said pump pressure from a first position blocking flow of said pump pressure to exhaust, to a second position connecting said pump to exhaust to regulate said pump pressure at a constant value, and said second valve element being held in said first position until said pump pressure rises above the value required to move said first valve element to said last position and then said second valve element moving to said second position to limit further rise of said pump pressure.

19. The invention defined in claim 10 and said means responsive to said signal means reducing the power developed by the engine and delivered to said input shaft.

20. In a transmission, an input shaft and output shaft, drive establishing means having a low and a high drive connecting said input and output shafts and operative in response to a high pressure to establish one drive and to a low pressure to establish another drive, governor means connected to said drive establishing means providing a pressure remaining substantially constant in a first ratio speed range, then increasing rapidly at the first to second shift speed and then remaining substantially constant in the second ratio speed range, a source of fluid pressure, pressure regulating means connected to said source to regulate the pressure of said source having fluid pressure control means proportionately responsive to said governor pressure controlling said pressure regulating means to regulate the pressure of said source at said low pressure and said high pressure, shift valve means connecting said source to said drive establishing means in a first position to supply one pressure to establish said low drive and in a second position to supply another pressure to establish said high drive and connected to said governor means and responsive to said governor pressure rise from said first to second shift speed to move from said first to said second position.

21. In a transmission, an input shaft and output shaft, drive establishing means connecting said input and output shafts operative in response to a high pressure to establish a first drive and to a low pressure to establish a second drive, governor means connected to said drive establishing means providing a pressure remaining substantially constant in a first ratio speed range, then increasing rapidly at the first to second shift speed and then remaining substantially constant in the second ratio speed range, a source of fluid pressure, pressure regulating means connected to said source to regulate the pressure of said source having fluid pressure control means inversely proportionately responsive to said governor pressure controlling said pressure regulating means to regulate the pressure of said source at said low pressure in said second speed range and said high pressure in said first speed range, shift valve means connecting said source to said drive establishing means in a first position to supply said low pressure to establish said first ratio and in a second position to supply said high pressure to establish said second ratio and connected to said governor means and responsive to said governor pressure rise from said first to second shift speed to move from said first to said second position.

22. In a control mechanism for an engine and transmission, a transmission providing a drive having an engaged and disengaged position between an input shaft and an output shaft and including motor means movable in a drive changing operation from one position to a drive position in which further movement of the motor means is stopped, said motor means being operative in response to power flow to move from said one position to said drive position to engage the drive and responsive to static force to maintain the motor means in said drive position to maintain the drive engaged, said mechanism including control means for supplying power to said motor means and for supplying static force to said motor means, and means actuated only by the supply of power to said motor means for the drive changing operation by said control means operative only in response to said supply of power to effect a reduction in the power developed by the engine and operative in response to said static force to permit an increase in the power developed by the engine.

References Cited in the file of this patent

UNITED STATES PATENTS

| | | |
|---|---|---|
| 1,979,488 | Perez | Nov. 6, 1934 |
| 2,651,949 | Barnes | Sept. 15, 1953 |
| 2,679,207 | Mategorin | May 25, 1954 |
| 2,732,805 | Lucien | Jan. 31, 1956 |
| 2,737,824 | Livermore | Mar. 13, 1956 |
| 2,738,689 | Dodge | Mar. 20, 1956 |
| 2,741,350 | Dodge | Apr. 10, 1956 |
| 2,815,684 | Roche | Dec. 10, 1957 |
| 2,873,618 | De Lorean | Feb. 17, 1959 |
| 2,895,344 | Holdeman et al. | July 21, 1959 |

FOREIGN PATENTS

| | | |
|---|---|---|
| 375,254 | Italy | Sept. 29, 1939 |